US010116256B2

(12) United States Patent
Miljkovic et al.

(10) Patent No.: US 10,116,256 B2
(45) Date of Patent: Oct. 30, 2018

(54) PHOTOVOLTAIC MODULES WITH CORNER JUNCTION BOXES AND ARRAY OF THE SAME

(71) Applicant: SolarCity Corporation, San Mateo, CA (US)

(72) Inventors: David Miljkovic, San Rafael, CA (US); Brian Atchley, San Rafael, CA (US); Jack Raymond West, San Rafael, CA (US); Nicholas G. J. de Vries, Fremont, CA (US)

(73) Assignee: SolarCity Corporation, San Mateo, CA (US)

( * ) Notice: Subject to any disclaimer, the term of this patent is extended or adjusted under 35 U.S.C. 154(b) by 249 days.

(21) Appl. No.: 14/983,358

(22) Filed: Dec. 29, 2015

(65) Prior Publication Data

US 2017/0187328 A1    Jun. 29, 2017

(51) Int. Cl.
*H01L 31/00* (2006.01)
*H02S 40/34* (2014.01)
*H02S 40/36* (2014.01)

(52) U.S. Cl.
CPC ............... *H02S 40/34* (2014.12); *H02S 40/36* (2014.12)

(58) Field of Classification Search
None
See application file for complete search history.

(56) References Cited

U.S. PATENT DOCUMENTS

| 5,043,024 A | 8/1991 | Cammerer et al. |
| 2010/0043862 A1 | 2/2010 | Croft |
| 2011/0005568 A1* | 1/2011 | Kim ............... H01L 31/0236 136/244 |
| 2013/0074909 A1 | 3/2013 | Sheng |
| 2013/0098420 A1 | 4/2013 | Sherman et al. |
| 2014/0182651 A1 | 7/2014 | Rogerson et al. |
| 2014/0246069 A1 | 9/2014 | Chaintreuil et al. |
| 2015/0155398 A1 | 6/2015 | Moslehi et al. |

FOREIGN PATENT DOCUMENTS

| DE | 102010056591 A1 | 7/2012 |
| EP | 0 373 235 A1 | 6/1990 |

OTHER PUBLICATIONS

International Search Report, dated Jan. 17, 2017, for International Patent Application No. PCT/US2016/057419, 6 pages.
Written Opinion, dated Jan. 17, 2017, for International Patent Application No. PCT/US2016/057419, 5 pages.

* cited by examiner

*Primary Examiner* — Shannon M Gardner

(74) *Attorney, Agent, or Firm* — Kilpatrick Townsend & Stockton LLP

(57) ABSTRACT

Photovoltaic modules are constructed having separate positive and negative junction boxes positioned at the corners of each photovoltaic module. A photovoltaic array assembled from these photovoltaic modules can be aligned such that the positive and negative junction boxes connect in an arrangement that minimizes the amount of wire needed to install the photovoltaic array. The arrangement of photovoltaic modules connecting the positive and negative junction boxes on adjacent photovoltaic modules leads to successive rows of photovoltaic modules in the photovoltaic array are oriented in opposing directions.

11 Claims, 10 Drawing Sheets

PHOTOVOLTAIC MODULES WITH CORNER JUNCTION BOXES AND ARRAY OF THE SAME

TECHNICAL FIELD

The present invention relates to photovoltaic modules and photovoltaic arrays assembled therefrom.

BACKGROUND OF THE INVENTION

Photovoltaic modules generally have a single junction box located on the back side, which takes the electicity generated by the photovotaic module and splits the electicity into positive and negative (V+ and V−), such that the photovoltaic module can be connected to other electical elements as part of a circuit (e.g., other modules, an interter, a micro inverter, etc.). Such junction boxes tend to be centrally located on the underside of photovoltaic modules, which can present physical conflict problems with other components of a solar panel array installation, can lead to complex or disadvantageous wiring paths, and can be susceptible to generating hotspots disadvantageous to the operation of the photovoltaic module.

Accordingly, there is a need for photovoltaic module configurations that diverge from traditional junction box locations and construction.

BRIEF SUMMARY OF THE INVENTION

The present disclosure provides for photovoltaic (PV) modules that break apart the typical junction box on the back of a PV module into positive-voltage (V+) negative voltage (V−) junction boxes, in order to enable the use of shorter lengths of wire, faster installation processes, and more efficient wire management. The present disclosure allows for a single type of PV module needed for any given solar panel array, where successive rows are configured to be electrically connected when oriented in opposite directions from each other.

Management of PV module wiring can present practical challenges. In many cases, the wiring must be clipped to a portion of the PV module or the frame of the PV module such that the wiring does not hang in a vulnerable position or touch a roof on which the PV module is mounted. In several situations, the wiring extending from the junction box must be bent around physical conflicts, often bending close to the junction box such that the installation is difficult to fit at the location of the junction box, and/or the wire is forced to bend sharply in a manner that may wear down or increase a breaking risk of the wire and its insulation, or even degrade the maximum or peak amount of current the wire can conduct. Further, each junction box can be a hotspot on the PV module, where the electricity collected at the center of the PV module can raise the temperature of the PV module at a localized region, risking a loss of efficiency or adverse effect on function of the PV module due to the relatively increased heat profile at or near the junction box.

The use of separated junction boxes located at the corners of the PV modules as considered herein can reduce the amount of wiring that is needed to form a string or array of PV modules. Instead of wiring that extends half a length or half a width of a PV module (or more), because the separated junction boxes are located at the corners of the PV modules, when PV modules are arranged adjacent to each other in a row as part of a string, the corresponding junction boxes are located right next to each other. By configuring each PV module to have the respective positive-voltage junction box and negative-voltage junction box in the same corners on the same edge of the PV module, when such PV modules are arranged horizontally adjacent to each other in the same orientation, the positive-voltage junction box of a first PV module will be positioned next to the negative-voltage junction box of an adjacent second PV module. Similarly, the negative-voltage junction box of the first PV module will be positioned next to the positive-voltage junction box of an adjacent third PV module (on the opposite side of the first PV module). As used herein, positive-voltage junction boxes and negative-voltage junction boxes can be referred to collectively as corner junction boxes.

Due to the relatively proximity of adjacent positive-voltage junction boxes and negative-voltage junction boxes on separate PV modules in the same row of a string or array, the wiring needed to electrically connect two such PV modules can be minimized to a length, for example, that covers the distance from a corner junction box to the edge of a PV module, the gap between the PV module and an adjacent PV module, and the distance from the edge of the adjacent PV module to the corner junction box on that adjacent PV module. Current junction boxes are about one meter (1 m) long. In such installations, the length of wire can be selected to be relative taught, or to have sufficient tension such that the wiring connection does not have an amount of slack that necessitates the use of wiring clips to secure the wire to either PV modules. The relatively short length and uncomplicated wiring path from one corner junction box to an adjacent corner junction can provide for both a quicker installation process and less expensive PV modules than with traditional junction boxes known in the field.

Moreover, by reducing or eliminating the need to bend wiring elements extending from junction boxes due to the close proximity of corner junction boxes to each other, the wiring extending from positive-voltage junction boxes and negative-voltage junction boxes can extend at a most advantageous angle (e.g. straight) for function and reliability of the wiring as part of a photovoltaic string or array.

For connecting PV modules in successive rows of a string or array (e.g. connecting one row of PV modules to a subsequent row of PV modules further up or "north" on a roof) the arrangement and orientation of PV modules can continue to provide for an efficient and minimal use of wiring. In an exemplary embodiment for any given roof or installation, a first row of PV modules can be oriented in the same direction, with a positive-voltage junction box located at the "upper" right-side corner of each PV module and a negative-voltage junction box located at the "upper" left-side corner of each PV module. A second row of PV modules, arranged above the first row of PV modules, can be oriented in the opposite direction relative to the first row of PV modules (or in other word, 180° away from the orientation of the first row). In this opposite orientation, with the corner junction boxes configured in the same locations, the "upper" side of a PV module becomes in effect a lower edge, such that at one lateral end of the two rows, a positive-voltage junction box and a negative-voltage junction box can be electrically connected with a relatively short or minimal amount of wiring, similar to how adjacent PV modules in the same row are connected.

Proceeding along the second row of PV modules, with a positive-voltage junction box located at the "lower" left-side corner of each PV module and a negative-voltage junction box located at the "lower" right-side corner of each PV module in the second row (i.e., modules rotated by 180 degrees relative to modules in the first row), the PV modules adjacent to each other in the second row are similarly connected with a relatively short or minimal amount of wiring. A third row of PV modules, arranged above the second row of PV modules can be oriented in the same direction relative to the first row of PV modules (and thus opposite to the orientation of the second row of PV modules). Between the second row of PV modules and the third row of PV modules, however, the spacing between corner junction boxes of the last PV module in the second row and the first PV module in the third row will be relatively distant, as the corner junction boxes can be on the lower edge of the second row of PV modules, and the corner junction boxes will be on the upper edge of the third row of PV modules. Accordingly, a long electrical connection (long relative to the short connections between adjacent corner junction boxes) will be needed between the corner junction boxes at a lateral end of an array where the second row of PV modules and the third row of PV modules are electrically connected. In some implementations, a jumper connection may be used to connect the corner junction boxes between a second row of PV modules and a third row of PV modules.

It can be understood that in the exemplary embodiment, a first, second, and third row of PV modules are identified as such relative to each other, as well as the designation of "upper" and "lower" edges there between, and that any photovoltaic array with multiple rows can be parsed or analyzed in such a manner. It can be further understood that when considering a portion or block of a solar panel array constructed from PV modules having corner junction boxes, that any given portion or section of three rows of the solar panel array can be connected with minimal wiring lengths between all but two of the PV modules, and that a single long electrical connection, optionally including a jumper connection, may be needed to form a single electrical string between three such PV module rows.

In some embodiments, the corner junction boxes can have retractable wiring functionality, such that once a corner junction box on a first PV module is connected to a corner junction box of an adjacent PV module, the amount of wiring that is slack can be retracted into the corner junction box, thereby providing for tension of the connection and mitigating the need for any wiring clips or similar wire management couplings. In some embodiments, the PV modules can be constructed such that only positive-voltage junction boxes have wiring, such that wiring extends from the positive-voltage junction box of a PV module to a receiving outlet on a negative-voltage junction box on an adjacent PV module. In other embodiments, the PV modules can be constructed such that only negative-voltage junction boxes have wiring, such that wiring extends from the negative-voltage junction box of a PV module to a receiving outlet on a positive-voltage junction box on an adjacent PV module. In further embodiments, PV modules can be constructed such that both positive-voltage junction boxes and negative-voltage junction boxes have wiring components, configured to connect with each other, such that wiring extends from either or both of the positive-voltage junction box of a PV module to wiring extending from a negative-voltage junction box on an adjacent PV module, meeting in between the two corner junction boxes.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

DETAILED DESCRIPTION OF THE INVENTION

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

The present invention discloses photovoltaic (PV) modules having separate and distinct positive-voltage (V+) negative voltage (V−) junction boxes instead of traditional combination junction boxes, on the underside or back of the PV module. Traditional junction boxes tend to be located toward the center of a PV module closer to one end, thus wiring connections between adjacent PV modules forming a string of PV modules as part of a solar panel array require wiring that extends across about half the length of the PV module or more, or half the width of the PV module or more, depending on whether the modules are connected in portrait or landscape orientation, to electrically connect to adjacent PV modules of the string or array. Such lengths of wiring connections are also needed to electrically connect to inverters, batteries, combiners, or other electrical components that are part of a circuit for collecting energy generated by the string or array of PV modules.

Figure 1:
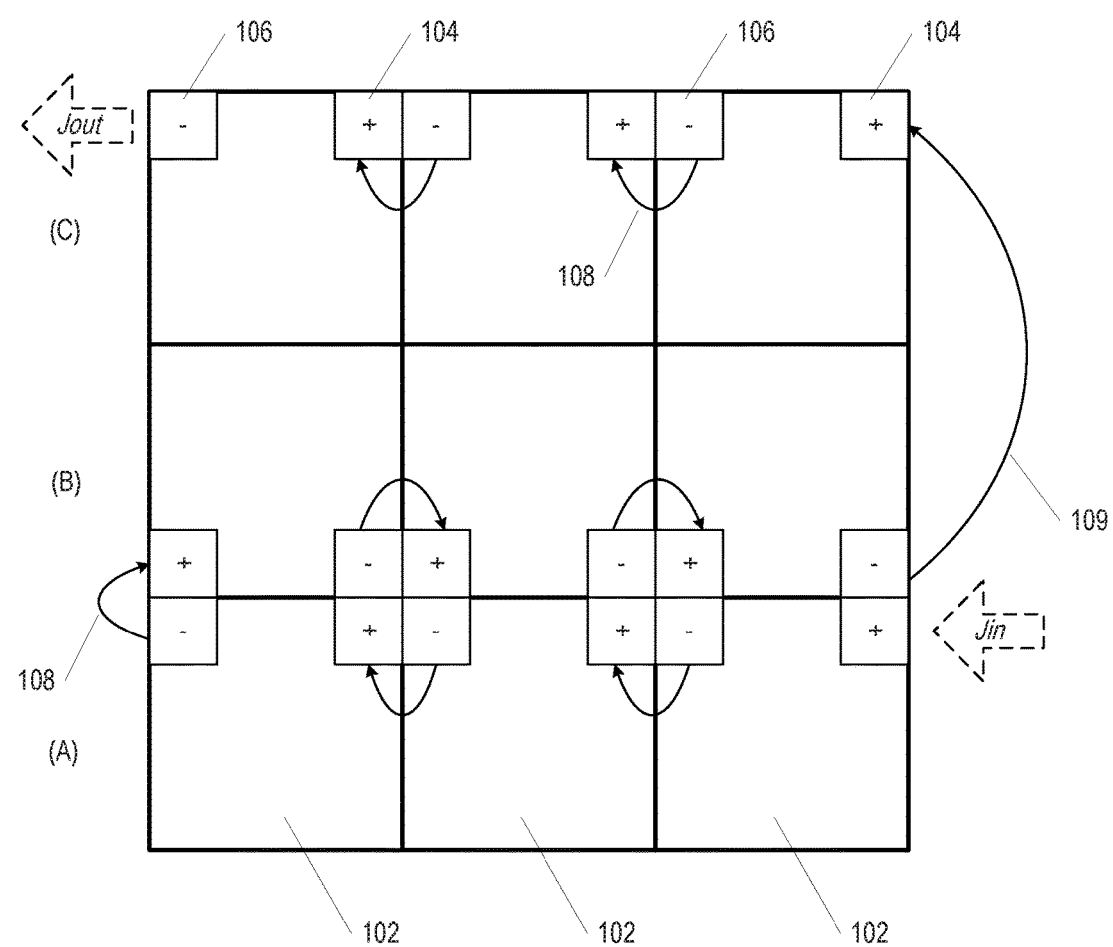
FIG. 1 is a schematic plan view representation of a photovoltaic array assembled from photovoltaic modules in a square configuration, with separate positive and negative junction boxes, according to embodiments of the disclosure.

FIG. 1 is a schematic plan view representation of photovoltaic array 100 assembled from square photovoltaic modules 102 into a square configuration, with separate positive-voltage box 104 and negative-voltage junction box 106 on each square photovoltaic module 102. On each square photovoltaic module 102, positive-voltage box 104 and negative-voltage junction box 106 are each located in a corner of square photovoltaic module 102, where those corners share the same edge of square photovoltaic module 102. Photovoltaic array 100 is shown having three rows of square photovoltaic modules 102 indicated as rows A, B, and C. Advantageously, only one type of solar panel, square photovoltaic module 102, is needed to construct and assemble photovoltaic array 100.

Square photovoltaic modules 102 of photovoltaic array 100 can be mounted and physically connected to each other according to systems known in the field, for example, by being supported on mounting rails, with connecting structures in between square photovoltaic modules 102, with connecting structures that attach to frames of square photovoltaic modules 102 to secure square photovoltaic modules 102 to each other or a mounting surface, with connecting structures that attach to grooves within frames of square photovoltaic modules 102 to secure square photovoltaic modules 102 to each other or a mounting surface, or the like.

Electrical connections 108 are represented between positive-voltage junction boxes 104 and negative-voltage junction boxes 106 on adjacent square photovoltaic modules 102 in each of rows A, B, and C. Electrical connection 108 is also shown electrically connecting square photovoltaic modules 102 between row A and row B on one side of photovoltaic array 100. Long electrical connection 109 is shown electrically connecting square photovoltaic modules 102 between row B and row C on a side of photovoltaic array 100 (opposite the side where square photovoltaic modules 102 between row A and row B are electrically connected). Long electrical connection 109 may require the use of wiring clips or other components to safely secure long electrical connection 109 to photovoltaic array 100.

Photovoltaic array 100, considered as part of a larger circuit of PV modules, such as a string or an array, can be configured to be connected to other electrical components of such a circuit. Input current $J_{in}$ is received by photovoltaic array 100 at one of square photovoltaic modules 102 in row A. The connection between all of square photovoltaic modules 102 in photovoltaic array 100 allows for current to pass through all of square photovoltaic modules 102 in rows A, B, and C, ultimately leaving photovoltaic array 100 as output current $J_{out}$ at one of square photovoltaic modules 102 in row C. While photovoltaic array 100 is shown with three square photovoltaic modules 102 in each of rows A, B, and C, it is understood that each row of square photovoltaic modules 102 can include more than three square photovoltaic modules 102 each, for example up to ten or more square photovoltaic modules 102. As each of square photovoltaic modules 102 are the same size, and thus have a similar number of photovoltaic cells per square photovoltaic module 102, each square photovoltaic module 102 should generate a relatively equal voltage.

Further, while photovoltaic array 100 is shown with three rows A, B, and C having an equal number of square photovoltaic modules 102, it is understood that any given row of square photovoltaic modules 102 in photovoltaic array 100 can have a greater or fewer number of square photovoltaic modules 102, for example to fit on an angled roof or to accommodate physical conflicts at an installation site. In such cases, one or more long electrical connections 109 may extend diagonally from one row of photovoltaic array 100 to another, or horizontally across gaps between square photovoltaic modules 102, but the arrangement pattern and orientation of square photovoltaic modules 102 would not be changed by rows having unequal numbers of square photovoltaic modules 102. It should be appreciated that although modules 102 in FIG. 1 are shown as square, the principles discussed above are equally applicable to rectangular PV modules that are not square, as discussed in the context of FIG. 2 and FIG. 4.

Figure 2:
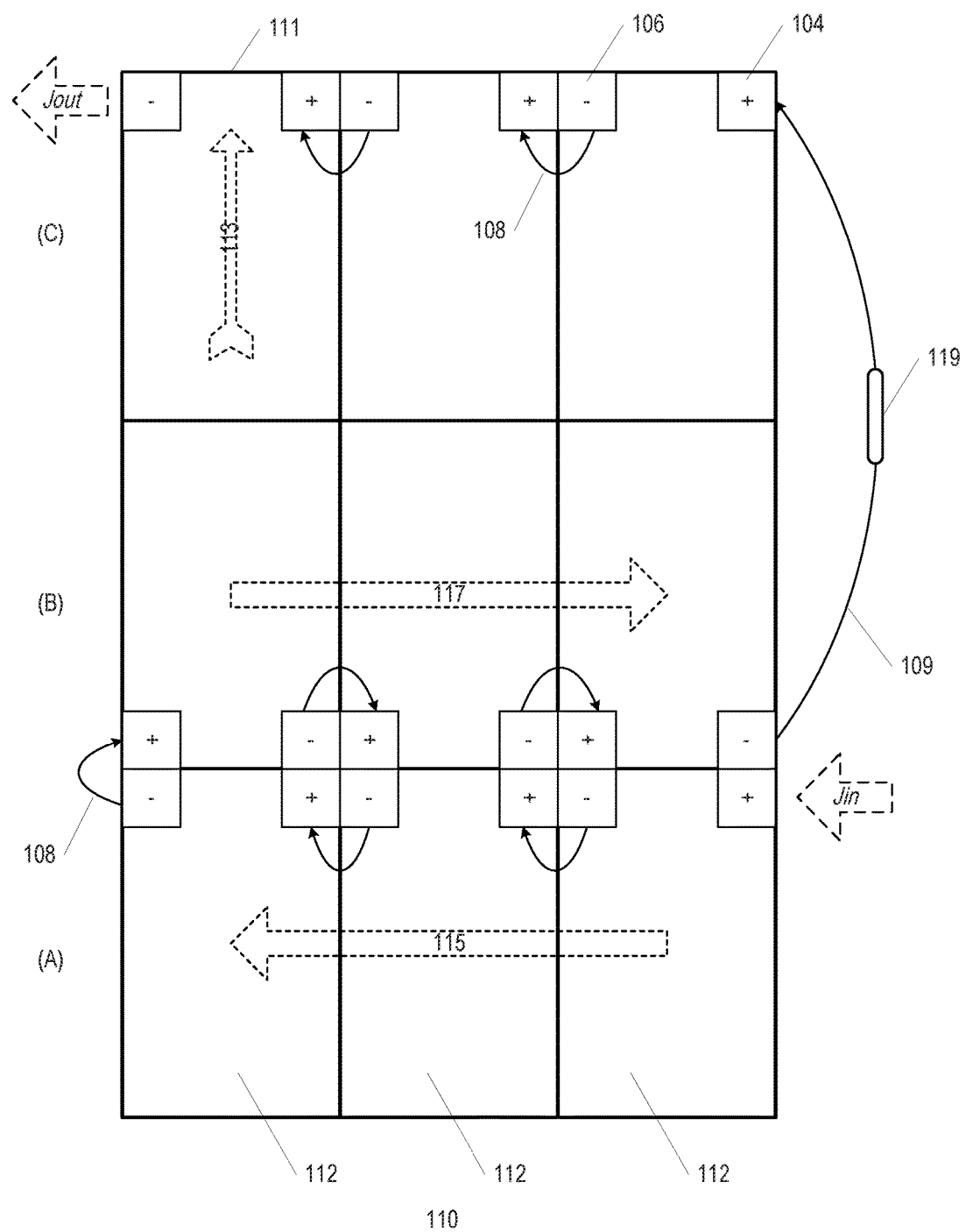
FIG. 2 is a schematic plan view representation of a photovoltaic array assembled from rectangular photovoltaic modules in a portrait configuration with separate positive and negative junction boxes, according to embodiments of the disclosure.

FIG. 2 is a schematic plan view representation of photovoltaic array 110 assembled from rectangular photovoltaic modules 112 in a portrait configuration with separate positive-voltage box 104 and negative-voltage junction box 106. For the sake of clarity herein, photovoltaic modules 112 are referred to as vertical photovoltaic modules 112 in order to distinguish from photovoltaic modules 114 as described in further detail below. Similarly, photovoltaic array 110 can alternatively be referred to as vertical photovoltaic array 110. Although referred to as vertical, it can be understood that vertical photovoltaic modules 112 can be installed and deployed as part of any given photovoltaic array installation in a vertical or horizontal orientation, as appropriate to the photovoltaic array installation. Advantageously, only one type of solar panel, vertical photovoltaic module 112, is needed to construct and assemble photovoltaic array 120.

Vertical photovoltaic modules 112 of photovoltaic array 110 can be mounted and physically connected to each other according to systems known in the field, for example, by being supported on mounting rails, with connecting structures in between vertical photovoltaic modules 112, with connecting structures that attach to frames of vertical photovoltaic modules 112 to secure vertical photovoltaic modules 112 to each other or a mounting surface, with connecting structures that attach to grooves within frames of vertical photovoltaic modules 101 to secure vertical photovoltaic modules 112 to each other or a mounting surface, or the like.

Electrical connections 108 are represented between positive-voltage junction boxes 104 and negative-voltage junction boxes 106 on adjacent vertical photovoltaic modules 112 in each of rows A, B, and C. Electrical connection 108 is also shown electrically connecting vertical photovoltaic modules 112 between row A and row B on one side of photovoltaic array 110. Long electrical connection 109 is shown electrically connecting vertical photovoltaic modules 112 between row B and row C on a side of photovoltaic array 110 (opposite the side where vertical photovoltaic modules 112 between row A and row B are electrically connected). Long electrical connection 109 may require the use of wiring clips or other components to safely secure long electrical connection 109 to photovoltaic array 110. Optionally, an electrical jumper 119 may be used to extend the length of long electrical connection 109, in cases such as with vertical photovoltaic modules 112 where the long edges of two vertical photovoltaic modules 112 may position corner junction boxes across successive rows of photovoltaic array 110 at a greater distance than any other pairing of corner junction boxes for photovoltaic array 110.

Photovoltaic array 110, considered as part of a larger circuit of PV modules, such as a string or an array, can be configured to be connected to other electrical components of such a circuit. Input current $J_{in}$ is received by photovoltaic array 110 at one of vertical photovoltaic modules 112 in row A. The connection between all of vertical photovoltaic modules 122 in photovoltaic array 120 allows for current to pass through all of vertical photovoltaic modules 112 in rows A, B, and C, ultimately leaving photovoltaic array 110 as output current $J_{out}$ at one of vertical photovoltaic modules 112 in row C. While photovoltaic array 110 is shown with three vertical photovoltaic modules 112 in each of rows A, B, and C, it is understood that each row of vertical photovoltaic modules 112 can include more than three vertical photovoltaic modules 112 each, for example up to ten or more vertical photovoltaic modules 112. As each of vertical photovoltaic modules 112 are the same size, and thus have a similar number of photovoltaic cells per vertical photovoltaic module 112, each vertical photovoltaic module 112 should generate a relatively equal voltage.

Photovoltaic array 110 further shows the orientation of vertical photovoltaic modules 112 as part of photovoltaic array 110. Each vertical photovoltaic module 112 has an alignment orientation, indicated by arrow 113, which is directed toward conducting edge 111 of vertical photovoltaic module 112, where conducting edge 111 refers to the edge of vertical photovoltaic module 112 upon which the corner junction boxes are mounted. Depending in which row of an array any given vertical photovoltaic module 112 is mounted, conducting edge 111 can be considered as the "upper" or "lower" edge of vertical photovoltaic module 112.

The orientation of vertical photovoltaic modules 112 within rows A, B, and C as part of photovoltaic array 110 is further illustrated by first direction 115 and second direction 117. As members of rows A and C, vertical photovoltaic modules 112 are connected in an orientation such that conducting edge 111 of each vertical photovoltaic module 112 is oriented toward an upper edge (or north end) of photovoltaic array 110. This orientation can thereby position positive-voltage junction box 104 in the upper right-side corner of each vertical photovoltaic module 112 and position negative-voltage junction box 106 in the upper left-side corner of each vertical photovoltaic module 112. The row A and row C orientation are indicated by first direction 115 (with the direction of the arrow representing first direction 115 selected to track the flow of current through photovoltaic array 110). Though not shown, current in row C will flow in the same direction as in row A.

As members of row B, vertical photovoltaic modules 112 are connected in an orientation such that conducting edge 111 of each vertical photovoltaic module 112 is oriented toward lower edge (or south end) of photovoltaic array 110. The row B orientation is indicated by second direction 117 (with the direction of the arrow representing second direction 117 selected to track the flow of current through photovoltaic array 110), where the direction of second direction 117 is 180° opposite of the direction of first direction 115. The orientation of vertical photovoltaic modules 112 in row B thus positions conducting edges 111 of vertical photovoltaic modules 112 in row B directly next to conducting edges 111 of vertical photovoltaic modules 112 in row A.

Further, while photovoltaic array 110 is shown with three rows A, B, and C having an equal number of vertical photovoltaic modules 112, it is understood that any given row of vertical photovoltaic modules 112 in photovoltaic array 110 can have a greater or fewer number of vertical photovoltaic modules 112, for example to fit on an angled roof or to accommodate physical conflicts at an installation site. In such cases, one or more long electrical connections 109 and/or jumpers 119 may extend diagonally from one row of photovoltaic array 110 to another, or horizontally across gaps between vertical photovoltaic modules 112, but the arrangement pattern and orientation of vertical photovoltaic modules 112 would not be changed by rows having unequal numbers of vertical photovoltaic modules 112.

Figure 3:
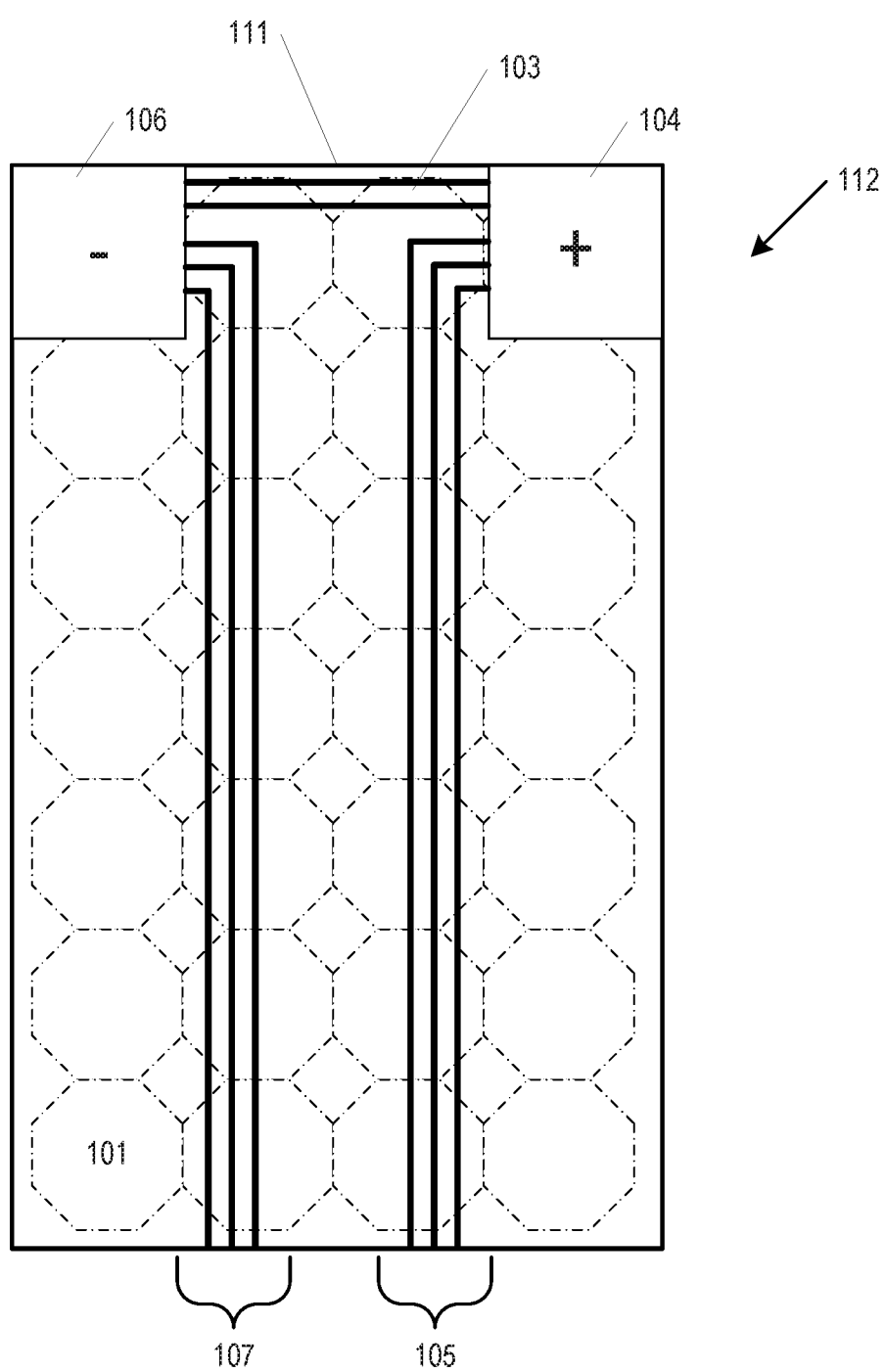
FIG. 3 is a schematic representation of a photovoltaic module as disclosed in FIG. 2, further showing individual photovoltaic cells and electrical ribbons of the photovoltaic module, according to aspects of the disclosure.

FIG. 3 is a schematic representation of vertical photovoltaic module 112 as disclosed in FIG. 2, further showing individual photovoltaic cells 101 and electrical ribbons of vertical photovoltaic module 112. Each of positive-voltage junction box 104 and negative-voltage junction box 106 must be electrically connected to photovoltaic cells 101 of vertical photovoltaic module 112. In traditional PV modules, a single electrical ribbon is needed to connect to and conduct collected electricity from photovoltaic cells 101 to a single junction box, where photovoltaic cells 101 are located on the upper side, or solar side, of the PV module. In the present embodiment, two electrical ribbons are used to connect to and conduct collected electricity from photovoltaic cells 101 to the corner junction boxes with split polarities. In particular, first electrical ribbon 105 is connected to photovoltaic cells 101 of vertical photovoltaic module 112, and is further connected to positive-voltage junction box 104, driving positive current to positive-voltage junction box 104. Similarly, second electrical ribbon 107 is connected to photovoltaic cells 101 of vertical photovoltaic module 112, and is further connected to negative-voltage junction box 106, driving negative current to negative-voltage junction box 106.

Additionally, at least one conduit 103 connects positive-voltage junction box 104 and negative-voltage junction box 106 to each other within vertical photovoltaic module 112. In some aspects, conduit 103 can be a direct and/or dedicated connection between positive-voltage junction box 104 and negative-voltage junction box 106, which can further be wiring proximate to conducting edge 111 of vertical photovoltaic module 112. In other aspects, conduit 103 can be a connection between positive-voltage junction box 104 and negative-voltage junction box 106 can be an indirect connection between positive-voltage junction box 104 and negative-voltage junction box 106 made through either or both of first electrical ribbon 105 and second electrical ribbon 107. In further aspects, conduit 103 can be a combination of dedicated and indirect electrical connections between positive-voltage junction box 104 and negative-voltage junction box 106 within vertical photovoltaic module 112. In all aspects, conduit 103 allows for electricity to be carried through vertical photovoltaic module 112 as part of a larger circuit.

Figure 4:
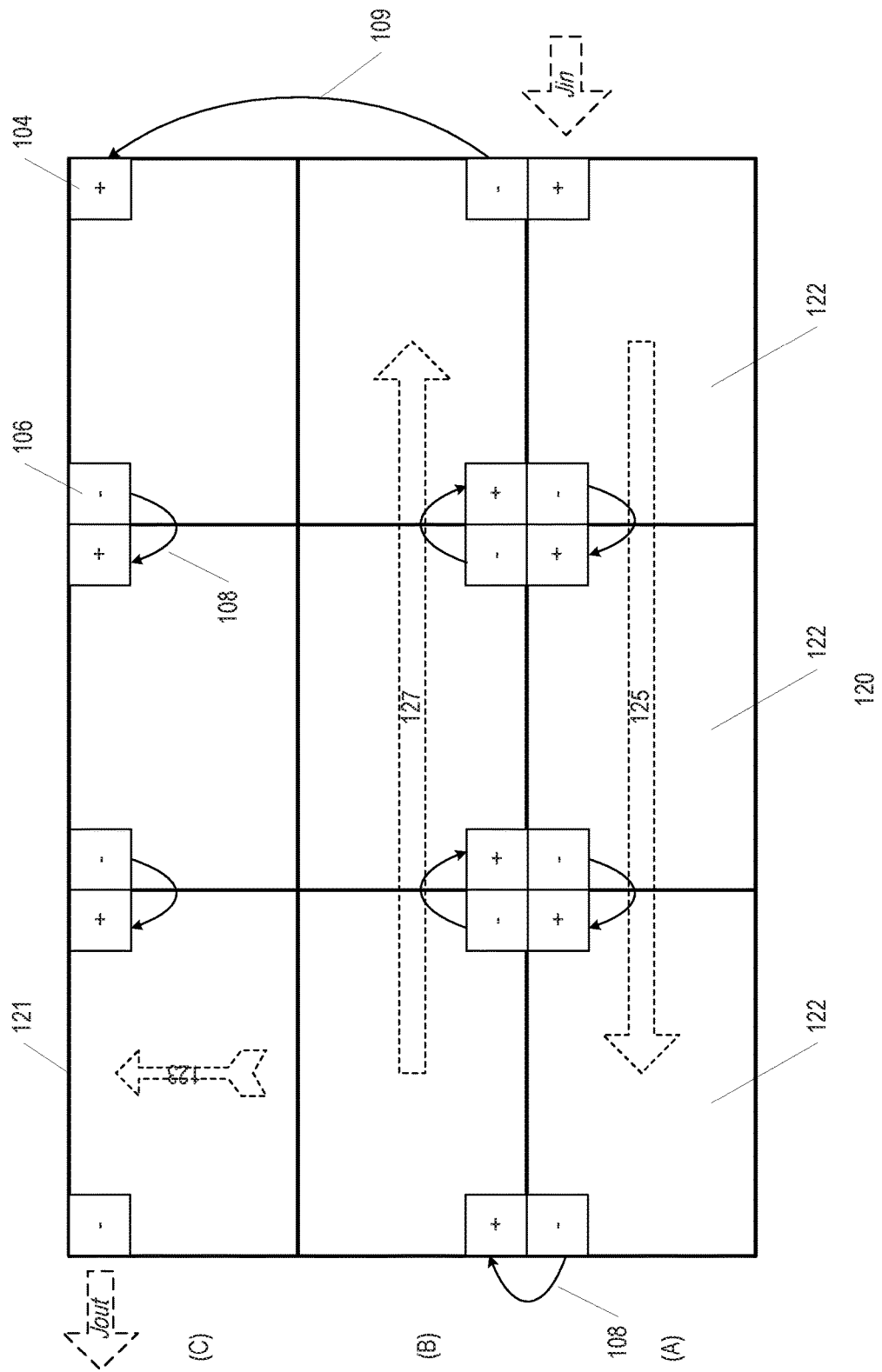
FIG. 4 is a schematic plan view representation of a photovoltaic array assembled from rectangular photovoltaic modules in a landscape configuration with separate positive and negative junction boxes, according to embodiments of the disclosure.

FIG. 4 is a schematic plan view representation of a photovoltaic array assembled from rectangular photovoltaic modules in a landscape configuration with separate positive-voltage junction box 104 and negative-voltage junction box 106. For the sake of clarity herein, photovoltaic modules 114 are referred to as horizontal photovoltaic modules 114 in order to distinguish from photovoltaic modules 112 as described above. Similarly, photovoltaic array 120 can alternatively be referred to as horizontal photovoltaic array 120. Although referred to as horizontal, it can be understood that horizontal photovoltaic modules 114 can be installed and deployed as part of any given photovoltaic array installation in a vertical or horizontal orientation, as appropriate to the photovoltaic array installation. Advantageously, only one type of solar panel, horizontal photovoltaic module 122, is needed to construct and assemble photovoltaic array 120.

Horizontal photovoltaic modules 122 of photovoltaic array 120 can be mounted and physically connected to each other according to systems known in the field, for example, by being supported on mounting rails, with connecting structures in between horizontal photovoltaic modules 122, with connecting structures that attach to frames of horizontal photovoltaic modules 122 to secure horizontal photovoltaic modules 122 to each other or a mounting surface, with connecting structures that attach to grooves within frames of horizontal photovoltaic modules 122 to secure horizontal photovoltaic modules 122 to each other or a mounting surface, or the like.

Electrical connections 108 are represented between positive-voltage junction boxes 104 and negative-voltage junction boxes 106 on adjacent horizontal photovoltaic modules 122 in each of rows A, B, and C. Electrical connection 108 is also shown electrically connecting horizontal photovoltaic modules 122 between row A and row B on one side of photovoltaic array 120. Long electrical connection 109 is shown electrically connecting horizontal photovoltaic modules 122 between row B and row C on a side of photovoltaic array 120 (opposite the side where horizontal photovoltaic modules 122 between row A and row B are electrically connected). Long electrical connection 109 may require the use of wiring clips or other components to safely secure long electrical connection 109 to photovoltaic array 120. Optionally, an electrical jumper (not shown) may be used to extend the length of long electrical connection 109, in cases such as with horizontal photovoltaic modules 122 where there is an unequal number of horizontal photovoltaic modules 122 and a long electrical connection 109 may need to extend diagonally along a long edge of at least one horizontal photovoltaic module 122, or any other configuration where corner junction boxes are positioned across successive rows of photovoltaic array 120 at a greater distance than any other pairing of corner junction boxes for photovoltaic array 120.

Photovoltaic array 120, considered as part of a larger circuit of PV modules, such as a string or an array, can be configured to be connected to other electrical components of such a circuit. Input current $J_{in}$ is received by photovoltaic array 120 at one of horizontal photovoltaic modules 122 in row A. The connection between all of horizontal photovoltaic modules 122 in photovoltaic array 120 allows for current to pass through all of horizontal photovoltaic modules 122 in rows A, B, and C, ultimately leaving photovoltaic array 120 as output current $J_{out}$ at one of horizontal photovoltaic modules 122 in row C. While photovoltaic array 120 is shown with three horizontal photovoltaic modules 122 in each of rows A, B, and C, it is understood that each row of horizontal photovoltaic modules 122 can include more than three horizontal photovoltaic modules 122 each, for example up to ten or more horizontal photovoltaic modules 122. As each of horizontal photovoltaic modules 122 are the same size, and thus have a similar number of photovoltaic cells per horizontal photovoltaic module 122, each horizontal photovoltaic module 122 should generate a relatively equal voltage.

Photovoltaic array 120 further shows the orientation of horizontal photovoltaic modules 122 as part of photovoltaic array 120. Each horizontal photovoltaic module 122 has an alignment orientation, indicated by arrow 123, which is directed toward conducting edge 121 of horizontal photovoltaic module 122, where conducting edge 121 refers to the edge of horizontal photovoltaic module 122 upon which the corner junction boxes are mounted. Depending in which row of an array any given horizontal photovoltaic module 122 is mounted, conducting edge 121 can be considered as the "upper" or "lower" edge of horizontal photovoltaic module 122.

The orientation of horizontal photovoltaic modules 122 within rows A, B, and C as part of photovoltaic array 120 is further illustrated by first direction 125 and second direction 127. As members of rows A and C, horizontal photovoltaic modules 122 are connected in an orientation such that conducting edge 121 of each horizontal photovoltaic module 122 is oriented toward an upper edge (or north end) of photovoltaic array 120. This orientation can thereby position positive-voltage junction box 104 in the upper right-side corner of each horizontal photovoltaic module 122 and position negative-voltage junction box 106 in the upper left-side corner of each horizontal photovoltaic module 122. The row A and row C orientation are indicated by first direction 125 (with the direction of the arrow representing first direction 125 selected to track the flow of current through photovoltaic array 120).

As members of row B, horizontal photovoltaic modules 122 are connected in an orientation such that conducting edge 121 of each horizontal photovoltaic module 122 is oriented toward lower edge (or south end) of photovoltaic array 120. The row B orientation is indicated by second direction 127 (with the direction of the arrow representing second direction 127 selected to track the flow of current through photovoltaic array 120), where the direction of second direction 127 is 180° opposite of the direction of first direction 125. The orientation of horizontal photovoltaic modules 122 in row B thus positions conducting edges 121 of horizontal photovoltaic modules 122 in row B directly next to conducting edges 121 of horizontal photovoltaic modules 122 in row A.

Further, while photovoltaic array 120 is shown with three rows A, B, and C having an equal number of horizontal photovoltaic modules 122, it is understood that any given row of horizontal photovoltaic modules 122 in photovoltaic array 120 can have a greater or fewer number of horizontal photovoltaic modules 122, for example to fit on an angled roof or to accommodate physical conflicts at an installation site. In such cases, one or more long electrical connection 109 may extend diagonally from one row of photovoltaic array 120 to another, or horizontally across gaps between horizontal photovoltaic modules 122, but the arrangement pattern and orientation of horizontal photovoltaic modules 122 would not be changed by rows having unequal numbers of horizontal photovoltaic modules 122.

Figure 5:
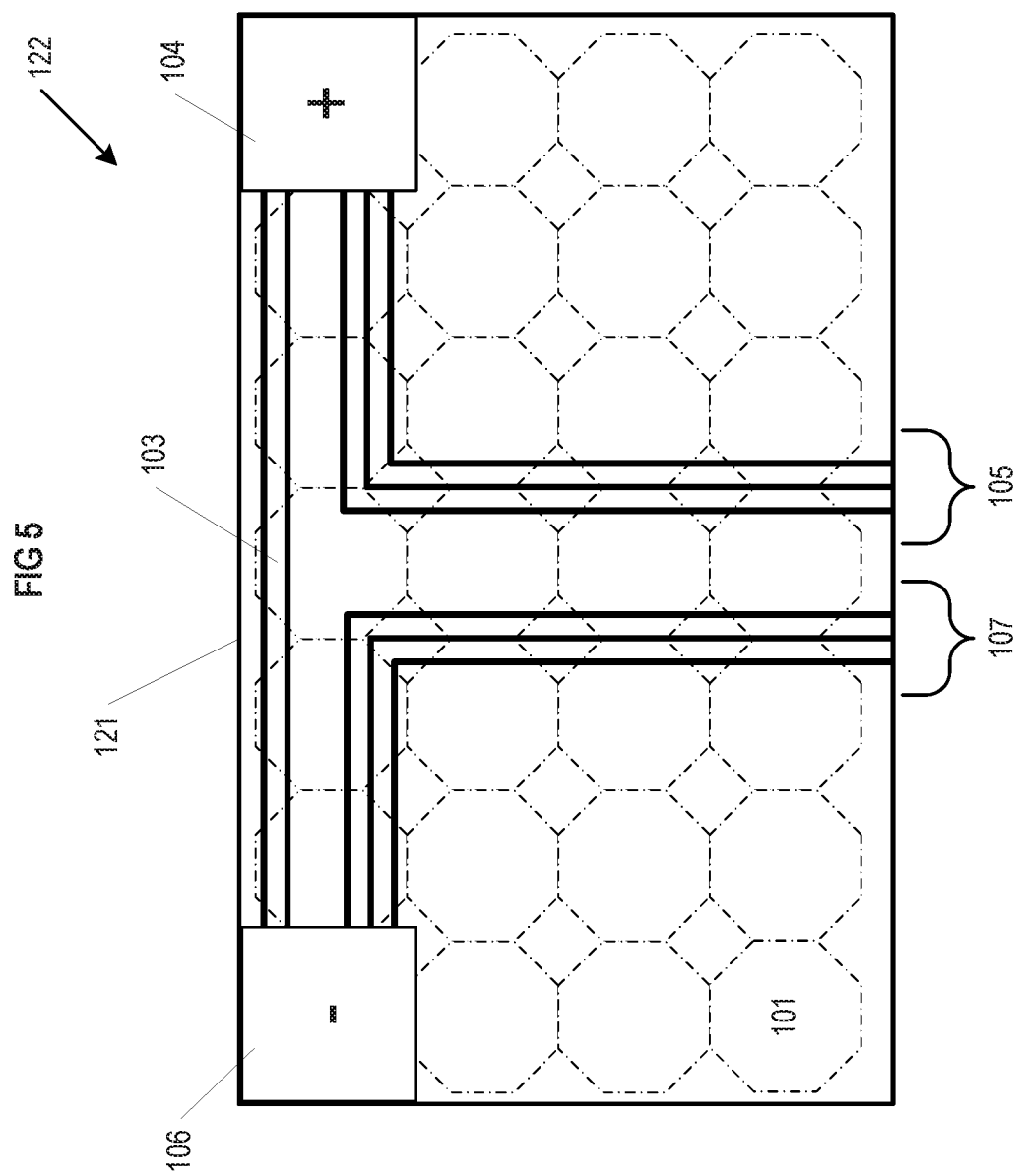
FIG. 5 is a schematic representation of a photovoltaic module as disclosed in FIG. 4, further showing individual photovoltaic cells and electrical ribbons of the photovoltaic module, according to aspects of the disclosure.

FIG. 5 is a schematic representation of horizontal photovoltaic module 122 as disclosed in FIG. 4, further showing individual photovoltaic cells 101 and electrical ribbons of horizontal photovoltaic module 122. Each of positive-voltage junction box 104 and negative-voltage junction box 106 must be electrically connected to photovoltaic cells 101 of horizontal photovoltaic module 122. In the present embodiment, two electrical ribbons are used to connect to and conduct collected electricity from photovoltaic cells 101 to the corner junction boxes with split polarities. In particular, first electrical ribbon 105 is connected to photovoltaic cells 101 of horizontal photovoltaic module 122, and is further connected to positive-voltage junction box 104, driving positive current to positive-voltage junction box 104. Similarly, second electrical ribbon 107 is connected to photovoltaic cells 101 of horizontal photovoltaic module 122, and is further connected to negative-voltage junction box 106, driving negative current to negative-voltage junction box 106.

Additionally, at least one conduit 103 connects positive-voltage junction box 104 and negative-voltage junction box 106 to each other within horizontal photovoltaic module 122. In some aspects, conduit 103 can be a direct and/or dedicated connection between positive-voltage junction box 104 and negative-voltage junction box 106, which can further be wiring proximate to conducting edge 121 of horizontal photovoltaic module 122. In other aspects, conduit 103 can be a connection between positive-voltage junction box 104 and negative-voltage junction box 106 can be an indirect connection between positive-voltage junction box 104 and negative-voltage junction box 106 made through either or both of first electrical ribbon 105 and second electrical ribbon 107. In further aspects, conduit 103 can be a combination of dedicated and indirect electrical connections between positive-voltage junction box 104 and negative-voltage junction box 106 within horizontal photovoltaic module 122. In all aspects, conduit 103 allows for electricity to be carried through horizontal photovoltaic module 122 as part of a larger circuit.

Figure 6:
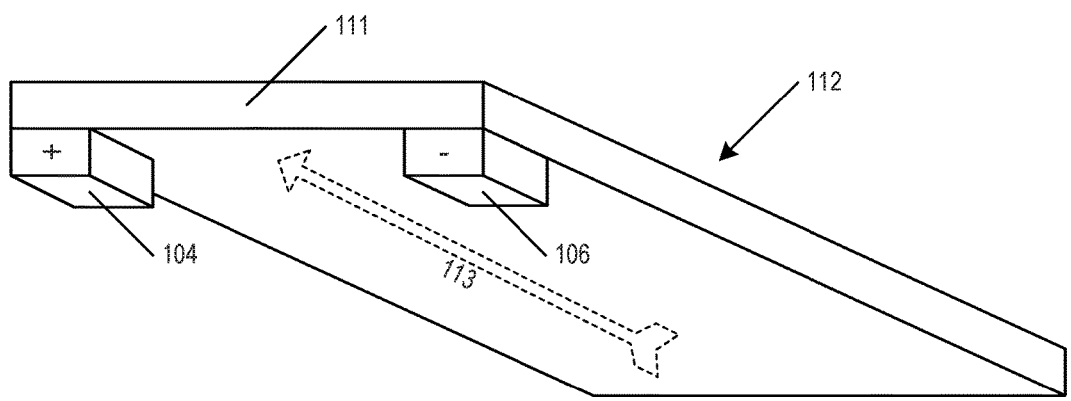
FIG. 6 is a schematic bottom perspective representation of a photovoltaic module as disclosed in FIG. 2, according to aspects of the disclosure.

FIG. 6 is a schematic bottom perspective representation of vertical photovoltaic module 112 as disclosed in FIG. 2. Particularly, positive-voltage junction box 104 and negative-voltage junction box 106 are shown on the underside of vertical photovoltaic module 112, positioned along conducting edge 111. The positive-voltage junction box 104 and negative-voltage junction box 106 are typically glued to the underside of vertical photovoltaic module 112, but can also or alternatively be attached to the frame or other component of vertical photovoltaic module 112 with a hardware connection. The alignment orientation of vertical photovoltaic module 112 is indicated by arrow 113.

Figure 7:
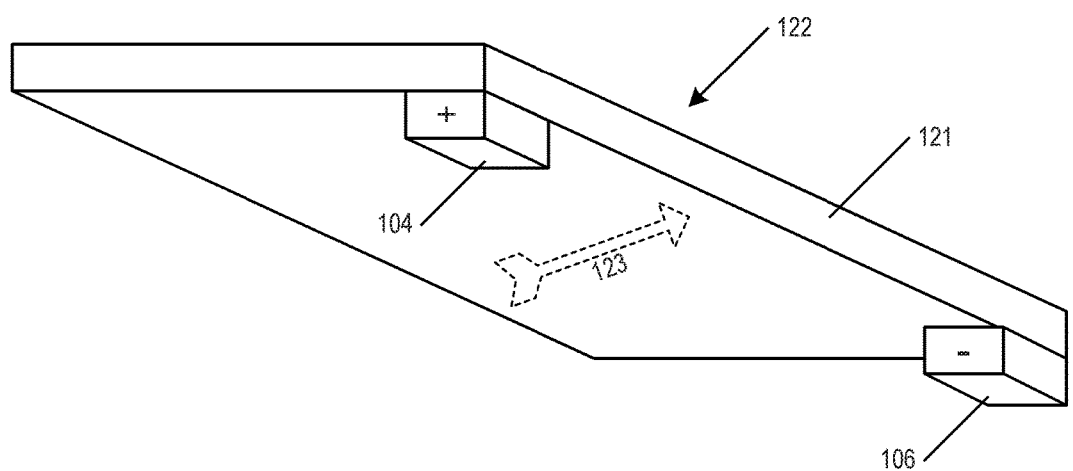
FIG. 7 is a schematic bottom perspective representation of a photovoltaic module as disclosed in FIG. 3, according to aspects of the disclosure.

FIG. 7 is a schematic bottom perspective representation of a photovoltaic module as disclosed in FIG. 3. Particularly, positive-voltage junction box 104 and negative-voltage junction box 106 are shown on the underside of horizontal photovoltaic module 122, positioned along conducting edge 121. The positive-voltage junction box 104 and negative-voltage junction box 106 are typically glued to the underside of horizontal photovoltaic module 122, but can also or alternatively be attached to the frame or other component of horizontal photovoltaic module 122 with a hardware connection. The alignment orientation of horizontal photovoltaic module 122 is indicated by arrow 123.

With traditional junction boxes, wherever such unitary junction boxes are positioned on the underside of a PV module, the directing of electricity to a single location can lead to the generation of a localized hotspot on the structure of the PV module, risking a loss of efficiency or adverse effect on function of the PV module due to the relatively increased heat profile at or near the unitary junction box. As seen both in FIG. 6 for vertical photovoltaic module 112 and FIG. 7 for horizontal photovoltaic module 122, electricity is directed to two separate locations on the underside of their respective PV modules. Accordingly, both horizontal photovoltaic modules 122 and vertical photovoltaic modules 112 can have less intense areas of heat, as compared to traditional PV modules, at least because of the lesser amount of electricity and current being routed to a single location at any given time, and/or due to the relatively greater surface area over which generated heat can dissipate. In such aspects, horizontal photovoltaic modules 122, square photovoltaic modules 102, and vertical photovoltaic modules 112 can operate more efficiently and with less risk of overheating due to the advantageous separation of the thermal profile on the underside of the respective PV modules.

Both vertical photovoltaic modules 112 and horizontal photovoltaic modules 122 as considered herein can be rectangular PV modules as known in the industry, including but not limited to, 60-cell PV modules, 72-cell PV modules, 80-cell PV modules, 96-cell PV modules, and the like.

Figure 8:
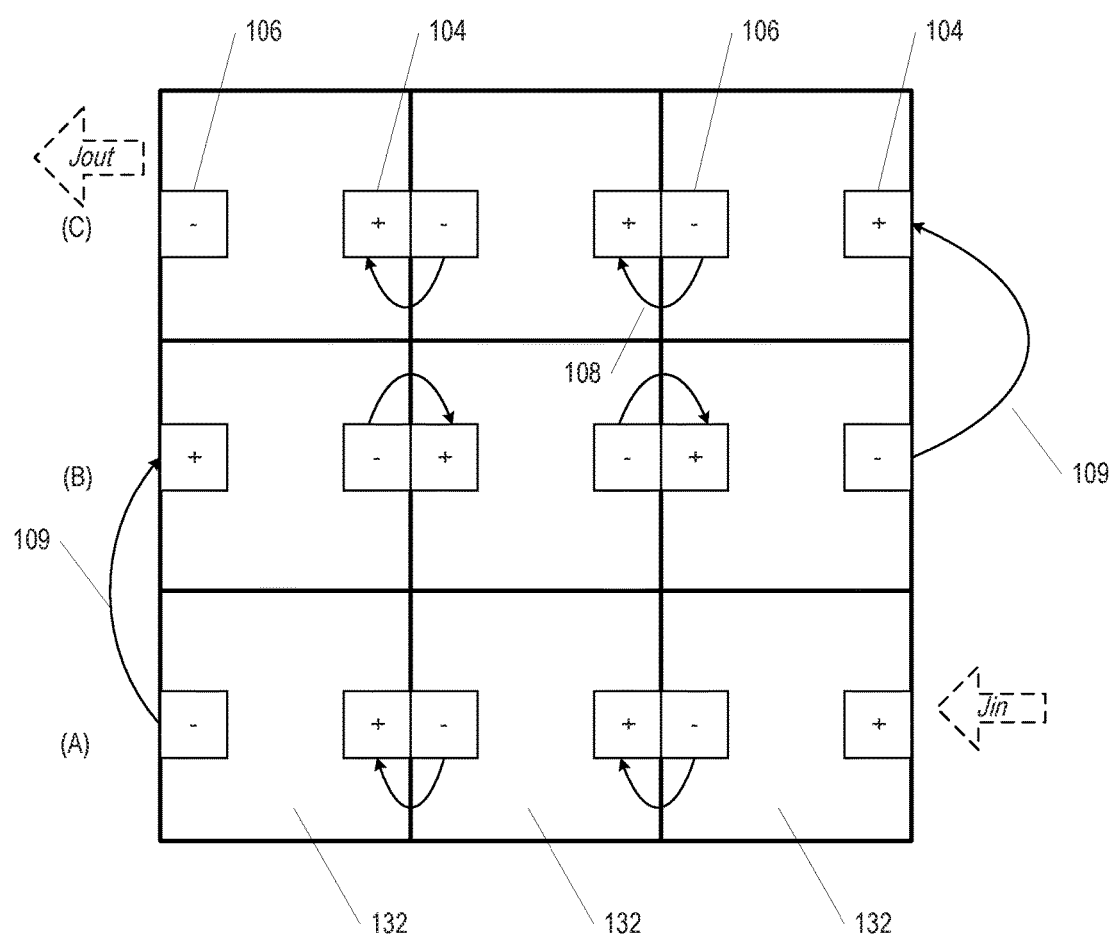
FIG. 8 is a schematic plan view representation of a photovoltaic array assembled from photovoltaic modules with separate positive and negative junction boxes, according to alternative embodiments of the disclosure.

FIG. 8 is a schematic plan view representation of a photovoltaic array 130 assembled from photovoltaic modules 132 with separate positive junction box 104 and negative junction box 106. Similar to FIG. 1, photovoltaic modules 132 (alternatively referred to as mid-side photovoltaic modules) are shown as square photovoltaic modules, however, the principles discussed regarding the arrangement of photovoltaic modules 132 are equally applicable to rectangular PV modules that are not square, as discussed in the context of FIG. 2 and FIG. 4. Photovoltaic modules 132 of photovoltaic array 130 can be mounted and physically connected to each other according to systems known in the field as described above.

On each photovoltaic module 132, positive-voltage box 104 and negative-voltage junction box 106 are each located on a side of photovoltaic module 132, where both of positive-voltage junction box 104 and negative-voltage junction box 106 are positioned at or near the middle of a side of photovoltaic module 132, on opposing sides of photovoltaic module 132. Photovoltaic array 130 is shown having three rows of photovoltaic modules 132 indicated as rows A, B, and C. Advantageously, only one type of solar panel, photovoltaic module 132, is needed to construct and assemble photovoltaic array 130.

By positioning positive-voltage junction box 104 and negative-voltage junction box 106 at or near the middle on opposing sides of photovoltaic module 132, photovoltaic module 132 allows for an alternative arrangement and configuration of structural elements for photovoltaic array 130 as compared to other embodiments of the present disclosure. For example, structural support members may mechanically connect to corners of photovoltaic module 132 without physical conflict with either of positive-voltage junction box 104 or negative-voltage junction box 106. Further, electrical connections to other members of a circuit may be more easily facilitated by positive-voltage junction box 104 and negative-voltage junction box 106 being positioned toward the middle of a side of photovoltaic module 132.

Electrical connections 108 are represented between positive-voltage junction boxes 104 and negative-voltage junction boxes 106 on adjacent photovoltaic modules 132 in each of rows A, B, and C. Long electrical connections 109 are also shown electrically connecting photovoltaic modules 132 between row A and row B on one side of photovoltaic array 130, and between row B and row C on an opposite side of photovoltaic array 130. Long electrical connection 109 may require the use of wiring clips or other components to safely secure long electrical connection 109 to photovoltaic array 100.

Photovoltaic array 130, considered as part of a larger circuit of PV modules, such as a string or an array, can be configured to be connected to other electrical components of such a circuit. Input current $J_{in}$ is received by photovoltaic array 130 at one of photovoltaic modules 132 in row A. The connection between all of photovoltaic modules 132 in photovoltaic array 130 allows for current to pass through all of photovoltaic modules 132 in rows A, B, and C, ultimately leaving photovoltaic array 130 as output current $J_{out}$ at one of photovoltaic modules 132 in row C. While photovoltaic array 130 is shown with three photovoltaic modules 132 in each of rows A, B, and C, it is understood that each row of photovoltaic modules 132 can include more than three photovoltaic modules 132 each, for example up to ten or more photovoltaic modules 132. As each of photovoltaic modules 132 are the same size, and thus have a similar number of photovoltaic cells per photovoltaic module 132, each photovoltaic module 132 should generate a relatively equal voltage.

Further, while photovoltaic array 130 is shown with three rows A, B, and C having an equal number of photovoltaic modules 132, it is understood that any given row of photovoltaic modules 132 in photovoltaic array 130 can have a greater or fewer number of photovoltaic modules 132, for example to fit on an angled roof or to accommodate physical conflicts at an installation site. In such cases, one or more long electrical connections 109 may extend diagonally from one row of photovoltaic array 130 to another, or horizontally across gaps between photovoltaic modules 132, but the arrangement pattern and orientation of photovoltaic modules 132 would not be changed by rows having unequal numbers of photovoltaic modules 132. In further embodiments, a photovoltaic array may be formed of one or more types of photovoltaic modules considered herein, for example, using both square photovoltaic modules 102 and photovoltaic modules 132, with the appropriate use of electrical connections 108 and long electrical connections 109 therebetween, where the use of mixed types of photovoltaic modules may accommodate unique structural requirements of a given installation.

Figure 9:
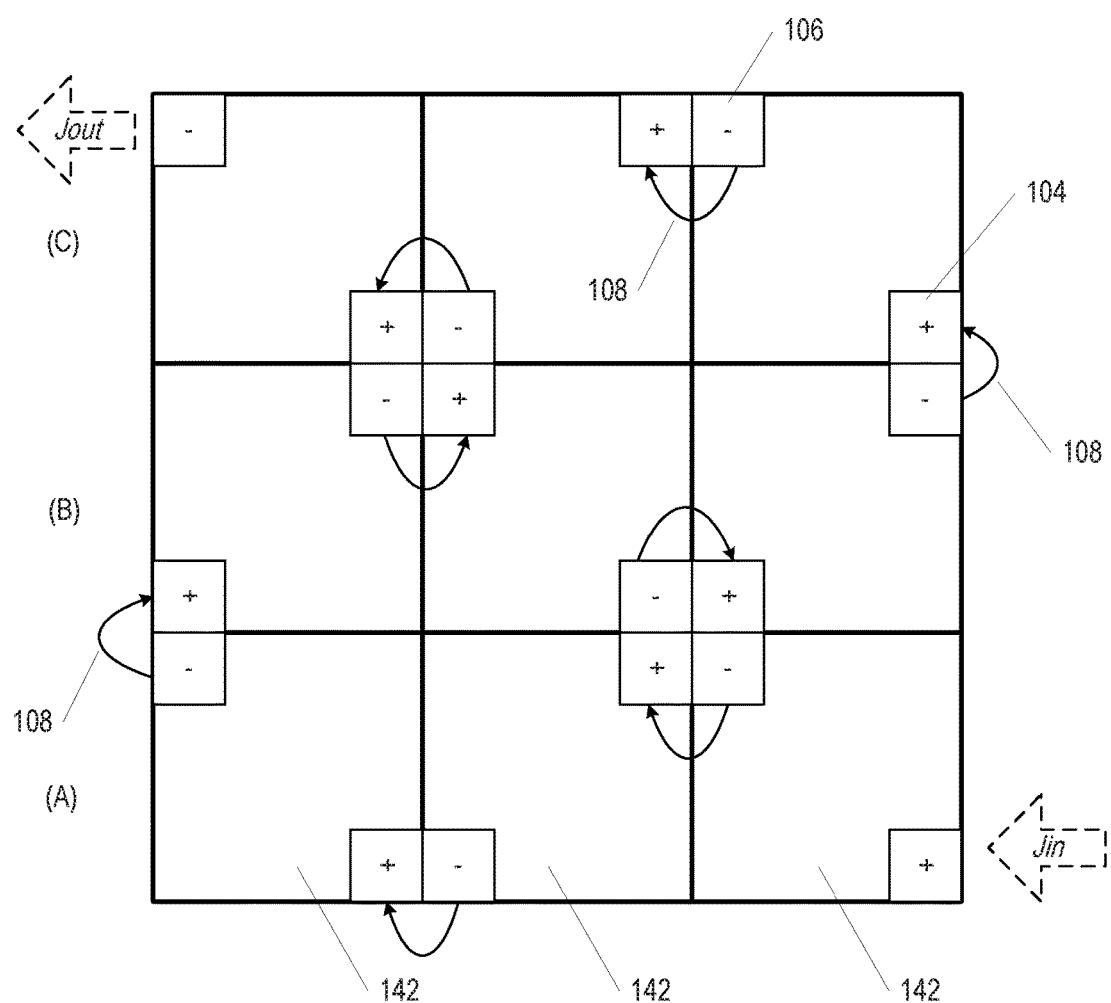
FIG. 9 is a schematic plan view representation of a photovoltaic array assembled from photovoltaic modules with separate positive and negative junction boxes, according to alternative embodiments of the disclosure.

FIG. 9 is a schematic plan view representation of a photovoltaic array 140 assembled from photovoltaic modules 142 with separate positive and negative junction boxes. Similar to FIG. 1, photovoltaic modules 142 (alternatively referred to as diagonalized photovoltaic modules) are shown as square photovoltaic modules, however, the principles discussed regarding the arrangement of photovoltaic modules 142 are equally applicable to rectangular PV modules that are not square, as discussed in the context of FIG. 2 and FIG. 4. Photovoltaic modules 142 of photovoltaic array 140 can be mounted and physically connected to each other according to systems known in the field as described above.

On each photovoltaic module 142, positive-voltage junction box 104 and negative-voltage junction box 106 are each located in corners of photovoltaic module 142, and more particularly, both of positive-voltage junction box 104 and negative-voltage junction box 106 are positioned in diagonally opposing corners of photovoltaic module 142. Photovoltaic array 140 is shown having three rows of photovoltaic modules 142 indicated as rows A, B, and C. Advantageously, only one type of solar panel, photovoltaic module 142, is needed to construct and assemble photovoltaic array 140.

By positioning positive-voltage junction box 104 and negative-voltage junction box 106 in opposing corners of photovoltaic module 142, photovoltaic module 142 allows for an alternative arrangement and configuration of structural elements for photovoltaic array 140 as compared to other embodiments of the present disclosure. For example, structural support members may mechanically connect to corners of photovoltaic module 142 where no junction box is present, or to sides of photovoltaic module 142, without physical conflict with either of positive-voltage junction box 104 or negative-voltage junction box 106. Further, electrical connections to other members of a circuit may be more easily facilitated by positive-voltage box 104 and negative-voltage junction box 106 being positioned in or near the corners of photovoltaic module 142.

Electrical connections 108 are represented between positive-voltage junction boxes 104 and negative-voltage junction boxes 106 on adjacent photovoltaic modules 142 in each of rows A, B, and C. Also as shown, electrical connections 108 can electrically connect photovoltaic modules 142 between row A and row B on one side of photovoltaic array 140, and between row B and row C on an opposite side of photovoltaic array 140. Accordingly, an arrangement of photovoltaic modules 142 can allow for electrical connections within and across rows of photovoltaic array 140 without a need for long electrical connections 109. It can be understood that within photovoltaic module 142, two electrical ribbons can be used to connect to and conduct collected electricity from photovoltaic cells to the opposing corner junction boxes with split polarities.

Photovoltaic array 140, considered as part of a larger circuit of PV modules, such as a string or an array, can be configured to be connected to other electrical components of such a circuit. Input current $J_{in}$ is received by photovoltaic array 140 at one of photovoltaic modules 142 in row A. The connection between all of photovoltaic modules 142 in photovoltaic array 140 allows for current to pass through all of photovoltaic modules 142 in rows A, B, and C, ultimately leaving photovoltaic array 140 as output current $J_{out}$ at one of photovoltaic modules 142 in row C. While photovoltaic array 140 is shown with three photovoltaic modules 142 in each of rows A, B, and C, it is understood that each row of photovoltaic modules 142 can include more than three photovoltaic modules 142 each, for example up to ten or more photovoltaic modules 142. As each of photovoltaic modules 142 are the same size, and thus have a similar number of photovoltaic cells per photovoltaic module 142, each photovoltaic module 142 should generate a relatively equal voltage.

Further, while photovoltaic array 140 is shown with three rows A, B, and C having an equal number of photovoltaic modules 142, it is understood that any given row of photovoltaic modules 142 in photovoltaic array 140 can have a greater or fewer number of photovoltaic modules 142, for example to fit on an angled roof or to accommodate physical conflicts at an installation site. In such cases, one or more long electrical connections 109 may extend diagonally from one row of photovoltaic array 140 to another, or horizontally across gaps between photovoltaic modules 142, but the arrangement pattern and orientation of photovoltaic modules 142 would not be changed by rows having unequal numbers of photovoltaic modules 142. In further embodiments, a photovoltaic array may be formed of one or more types of photovoltaic modules considered herein, for example, using both square photovoltaic modules 102 and photovoltaic modules 142, with the appropriate use of electrical connections 108 and long electrical connections 109 therebetween, where the use of mixed types of photovoltaic modules may accommodate unique structural requirements of a given installation.

Figure 10:
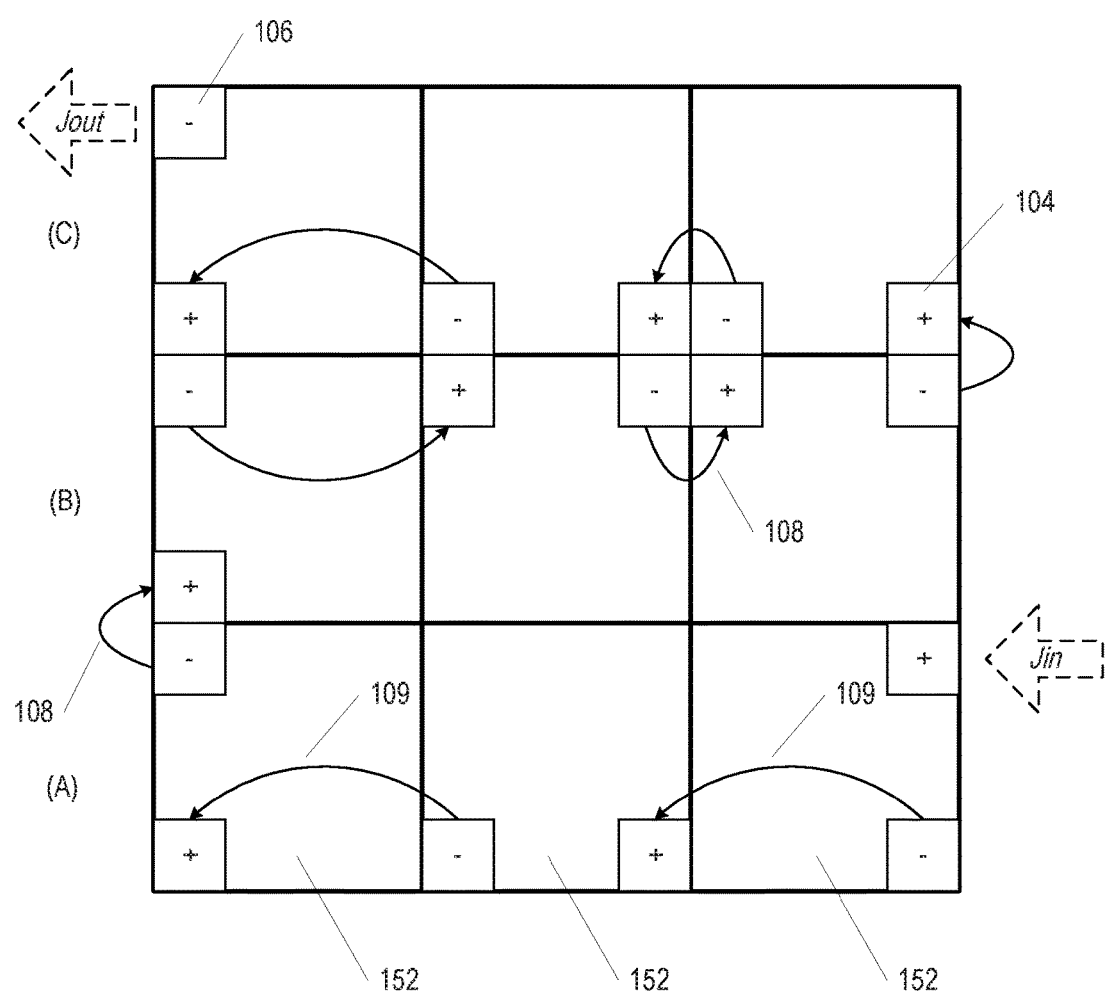
FIG. 10 is a schematic plan view representation of a photovoltaic array assembled from photovoltaic modules with separate positive and negative junction boxes, according to embodiments of the disclosure.

FIG. 10 is a schematic plan view representation of a photovoltaic array 150 assembled from photovoltaic modules 152 with separate positive and negative junction boxes. Similar to FIG. 1, photovoltaic modules 152 (alternatively referred to as dual orientation photovoltaic modules) are shown as square photovoltaic modules, however, the principles discussed regarding the arrangement of photovoltaic modules 152 are equally applicable to rectangular PV modules that are not square, as discussed in the context of FIG. 2 and FIG. 4. Photovoltaic modules 152 of photovoltaic array 150 can be mounted and physically connected to each other according to systems known in the field as described above.

On each photovoltaic module 152, positive-voltage junction box 104 and negative-voltage junction box 106 are each located in corners of photovoltaic module 152, where those corners share the same edge of square photovoltaic module 152. The arrangement of photovoltaic module 152 to form photovoltaic array 150 leads to a configuration having positive-voltage junction boxes 104 and negative-voltage junction boxes 106 biased along one side of photovoltaic array 150 (the left side of photovoltaic array 150 as shown in FIG. 10). Photovoltaic array 150 is shown having three rows of photovoltaic modules 152 indicated as rows A, B, and C. Advantageously, only one type of solar panel, photovoltaic module 152, is needed to construct and assemble photovoltaic array 150.

By positioning positive-voltage junction box 104 and negative-voltage junction box 106 in corners of photovoltaic module 152, and arranging photovoltaic modules 152 such that positive-voltage junction boxes 104 and negative-voltage junction boxes 106 are located along one side of photovoltaic array 150, the configuration allows for an alternative arrangement and configuration of structural elements for photovoltaic array 150 as compared to other embodiments of the present disclosure. For example, electrical connections to other members of a circuit may be more easily facilitated by positive-voltage boxes 104 and negative-voltage junction boxes 106 being positioned along one edge of photovoltaic module 152, providing for multiple locations for other circuit members to connect to photovoltaic array 150.

Electrical connections 108 and long electrical connections 109 are represented between positive-voltage junction boxes 104 and negative-voltage junction boxes 106 on adjacent photovoltaic modules 152 in each of rows A, B, and C. As can be seen, some of photovoltaic modules 152 can be arranged such that one side of photovoltaic array 150 has positive-voltage junction boxes 104 and negative-voltage junction boxes 106 running along that side. Photovoltaic modules 152 forming the remainder of photovoltaic array 150 can be arranged in a second orientation to facilitate the flow of current through the whole of photovoltaic array 150. As shown, electrical connections 108 are electrically connecting photovoltaic modules 152 between row A and row B on one side of photovoltaic array 150, and between row B and row C on an opposite side of photovoltaic array 150. Further, long electrical connections 109 and electrical connections 108 can be used as appropriate to connect individual photovoltaic modules 152 throughout sections of photovoltaic array 150 that are not members of a side of photovoltaic array 150 positive-voltage junction boxes 104 and negative-voltage junction boxes 106 running along that side.

Photovoltaic array 150, considered as part of a larger circuit of PV modules, such as a string or an array, can be configured to be connected to other electrical components of such a circuit. Input current $J_{in}$ is received by photovoltaic array 150 at one of photovoltaic modules 152 in row A. The connection between all of photovoltaic modules 152 in photovoltaic array 150 allows for current to pass through all of photovoltaic modules 152 in rows A, B, and C, ultimately leaving photovoltaic array 150 as output current $J_{out}$ at one of photovoltaic modules 152 in row C. While photovoltaic array 150 is shown with three photovoltaic modules 152 in each of rows A, B, and C, it is understood that each row of photovoltaic modules 152 can include more than three photovoltaic modules 152 each, for example up to ten or more photovoltaic modules 152. As each of photovoltaic modules 152 are the same size, and thus have a similar number of photovoltaic cells per photovoltaic module 152, each photovoltaic module 152 should generate a relatively equal voltage.

Further, while photovoltaic array 150 is shown with three rows A, B, and C having an equal number of photovoltaic modules 152, it is understood that any given row of photovoltaic modules 152 in photovoltaic array 150 can have a greater or fewer number of photovoltaic modules 152, for example to fit on an angled roof or to accommodate physical conflicts at an installation site. In such cases, one or more long electrical connections 109 may extend diagonally from one row of photovoltaic array 150 to another, or horizontally across gaps between photovoltaic modules 152, but the arrangement pattern and orientation of photovoltaic modules 152 would not be changed by rows having unequal numbers of photovoltaic modules 152. In further embodiments, a photovoltaic array may be formed of one or more types of photovoltaic modules considered herein, for example, using both square photovoltaic modules 102 and photovoltaic modules 152, with the appropriate use of electrical connections 108 and long electrical connections 109 therebetween, where the use of mixed types of photovoltaic modules may accommodate unique structural requirements of a given installation.

Figure 11:
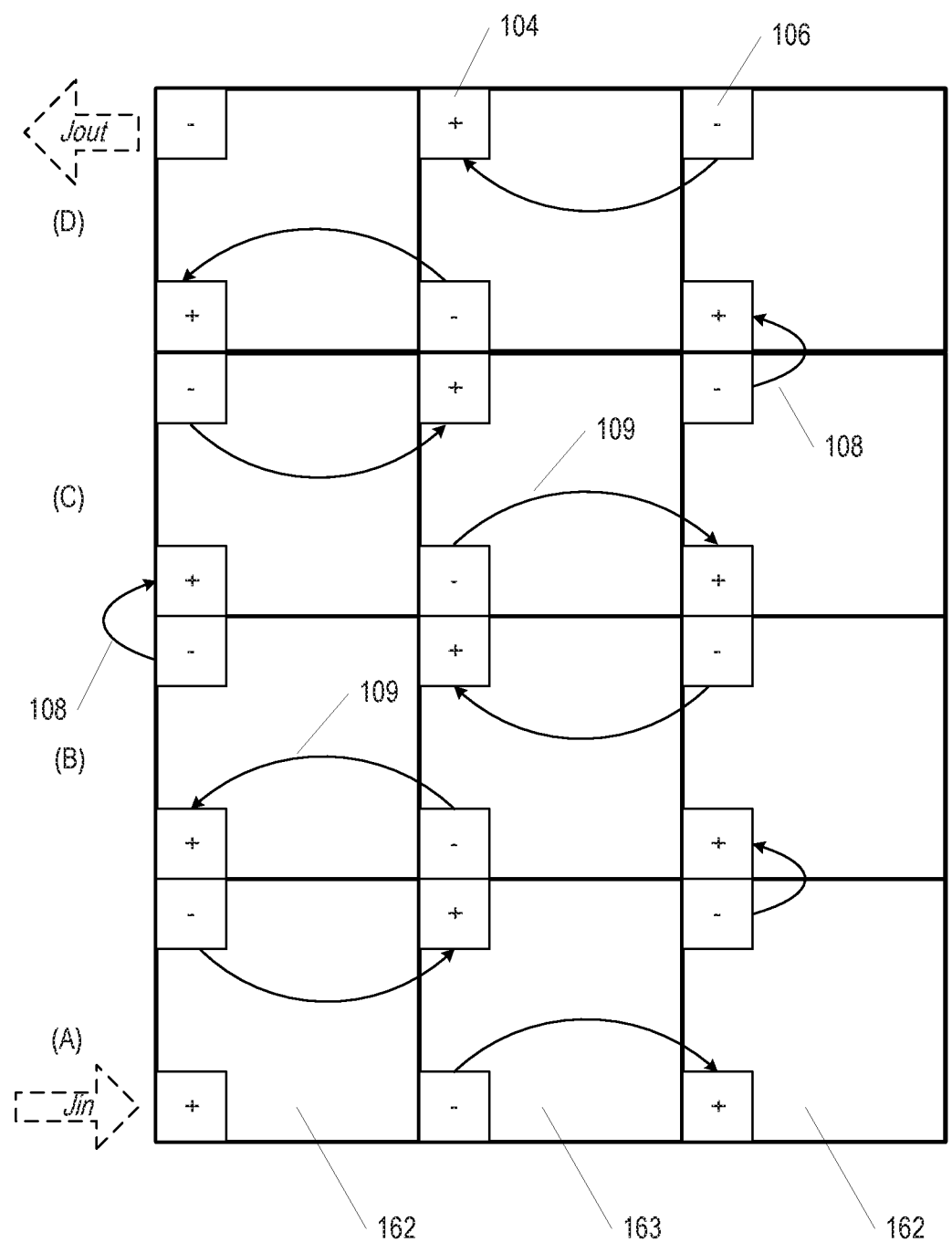
FIG. 11 is a schematic plan view representation of a photovoltaic array assembled from photovoltaic modules with separate positive and negative junction boxes, according to alternative embodiments of the disclosure.

FIG. 11 is a schematic plan view representation of a photovoltaic array 160 assembled from first-type photovoltaic modules 162 and second-type photovoltaic modules 163 with separate positive and negative junction boxes. Similar to FIG. 1, first-type photovoltaic modules 162 and second-type photovoltaic modules 163 (alternatively referred to as single edge photovoltaic modules) are shown as square photovoltaic modules, however, the principles discussed regarding the arrangement of first-type photovoltaic modules 162 and second-type photovoltaic modules 163 are equally applicable to rectangular PV modules that are not square, as discussed in the context of FIG. 2 and FIG. 4. First-type photovoltaic modules 162 and second-type photovoltaic modules 163 of photovoltaic array 160 can be mounted and physically connected to each other according to systems known in the field as described above.

On each first-type photovoltaic module 162, positive-voltage junction box 104 and negative-voltage junction box 106 are each located in corners of first-type photovoltaic module 162, where those corners share the same edge of first-type photovoltaic module 162. Similarly, on each second-type photovoltaic module 163, positive-voltage junction box 104 and negative-voltage junction box 106 are each located in corners of second-type photovoltaic module 163, where those corners share the same edge of second-type photovoltaic module 163. Moreover, the edge having positive-voltage junction box 104 and negative-voltage junction box 106 are the same between first-type photovoltaic modules 162 and second-type photovoltaic modules 163, except with the location of positive-voltage junction box 104 and negative-voltage junction box 106 switched. The arrangement of first-type photovoltaic modules 162 and second-type photovoltaic modules 163 to form photovoltaic array 160 leads to a configuration having all positive-voltage junction boxes 104 and negative-voltage junction boxes 106 biased toward one side of photovoltaic array 160 (the left side of photovoltaic array 150 as shown in FIG. 11). Photovoltaic array 160 is shown having four rows of photovoltaic modules including first-type photovoltaic modules 162 and second-type photovoltaic modules 163 indicated as rows A, B, C, and D. Advantageously, only two types of solar panel, first-type photovoltaic modules 162 and second-type photovoltaic modules 163, are needed to construct and assemble photovoltaic array 160. In some aspects, positive-voltage junction box 104 and negative-voltage junction box 106 of either one of first-type photovoltaic modules 162 and second-type photovoltaic modules 163 can be swapped to change a photovoltaic module from first-type photovoltaic module 162 to second-type photovoltaic module 163, or vice versa.

By positioning positive-voltage junction box 104 and negative-voltage junction box 106 in corners of first-type photovoltaic modules 162 and second-type photovoltaic modules 163, and arranging first-type photovoltaic modules 162 and second-type photovoltaic modules 163 such that positive-voltage junction boxes 104 and negative-voltage junction boxes 106 are located biased toward one side of photovoltaic array 160, the configuration allows for an alternative arrangement and configuration of structural elements for photovoltaic array 160 as compared to other embodiments of the present disclosure. For example, structural support members may mechanically connect to sides of first-type photovoltaic modules 162 and second-type photovoltaic modules 163 opposite of junction boxes without physical conflict with either of positive-voltage junction box 104 or negative-voltage junction box 106. Further, electrical connections to other members of a circuit may be more easily facilitated by positive-voltage boxes 104 and negative-voltage junction boxes 106 being positioned along one edge of first-type photovoltaic module 162 (or second-type photovoltaic module 163), providing for current to enter photovoltaic array 160 and exit photovoltaic array 160 on the same side of photovoltaic array 160.

Long electrical connections 109 are represented between positive-voltage junction boxes 104 and negative-voltage junction boxes 106 on adjacent first-type photovoltaic modules 162 and second-type photovoltaic modules 163 in each of rows A, B, C, and D. As shown, electrical connections 108 are electrically connecting first-type photovoltaic modules 162 between row B and row C on one side of photovoltaic array 160, and electrically connecting second-type photovoltaic modules 163 between of row A and row B, and between row C and row D, on an opposite side of photovoltaic array 160.

Photovoltaic array 160, considered as part of a larger circuit of PV modules, such as a string or an array, can be configured to be connected to other electrical components of such a circuit. Input current $J_{in}$ is received by photovoltaic array 160 at one of first-type photovoltaic modules 162 in row A. The connection between all of first-type photovoltaic modules 162 and second-type photovoltaic modules 163 in photovoltaic array 160 allows for current to pass through all of photovoltaic modules in rows A, B, C, and D ultimately leaving photovoltaic array 160 as output current $J_{out}$ at one of first-type photovoltaic modules 162 in row D. While photovoltaic array 160 is shown with three photovoltaic modules (alternating between first-type photovoltaic modules 162 and second-type photovoltaic modules 163) in each of rows A, B, C, and D, it is understood that each row of photovoltaic modules can include more than three photovoltaic modules each, for example up to ten or more photovoltaic modules. As each of first-type photovoltaic modules 162 and second-type photovoltaic modules 163 are the same size, and thus have a similar number of photovoltaic cells per photovoltaic module, all of first-type photovoltaic modules 162 and second-type photovoltaic modules 163 should generate a relatively equal voltage.

The arrangement forming photovoltaic array 160 provides for installations where photovoltaic array 160 can connect to a larger circuit on a single side of photovoltaic array 160. It can also be understood that while FIG. 11 shows an embodiment of photovoltaic array 160 where all of positive-voltage junction boxes 104 and negative-voltage junction boxes 106 are biased toward the left side of their respective first-type photovoltaic modules 162 or second-type photovoltaic modules 163, a further alternative embodiment can have all of positive-voltage junction boxes 104 and negative-voltage junction boxes 106 biased toward the right side of their respective first-type photovoltaic modules 162 or second-type photovoltaic modules 163. In either embodiment, photovoltaic array 160 can connect to other circuit element on a single side of photovoltaic array 160.

Further, while photovoltaic array 160 is shown with four rows A, B, C, and D having an equal number of photovoltaic modules, it is understood that any given row of photovoltaic modules in photovoltaic array 160 can have a greater or fewer number of first-type photovoltaic modules 162 or second-type photovoltaic modules 163, for example to fit on an angled roof or to accommodate physical conflicts at an installation site. In such cases, one or more long electrical connections 109 may extend diagonally from one row of photovoltaic array 160 to another, or horizontally across gaps between photovoltaic modules in the same row of photovoltaic array 160, but the arrangement pattern and orientation of first-type photovoltaic modules 162 or second-type photovoltaic modules 163 would not be changed by rows having unequal numbers of first-type photovoltaic modules 162 or second-type photovoltaic modules 163. In further embodiments, a photovoltaic array may be formed of one or more types of photovoltaic modules considered herein, for example, using both square photovoltaic modules 102, first-type photovoltaic modules 162, and second-type photovoltaic modules 163, with the appropriate use of electrical connections 108 and long electrical connections 109 therebetween, where the use of mixed types of photovoltaic modules may accommodate unique structural requirements of a given installation.

For all of square photovoltaic modules 102, vertical photovoltaic modules 112, and horizontal photovoltaic modules 122 as considered herein, positive-voltage junction boxes 104 and negative-voltage junction boxes 106 can be selected to have the same type of electrical connector. This can allow for interchangeability and backwards-compatibility, where one of square photovoltaic modules 102, vertical photovoltaic modules 112, or horizontal photovoltaic modules 122 can be inserted into an existing photovoltaic array installation as a replacement for an older or damaged PV module. Such replicability is generally based on the voltage of the given PV modules and array, and thus the location of junction boxes in the corners of a PV modules does not disqualify photovoltaic modules as disclosed herein from being used with older installations or PV modules.

In some embodiments, the present disclosure is directed to a photovoltaic module that can include photovoltaic cells arranged in a rectangular configuration located on a solar side or an upper side of the photovoltaic module, a positive-voltage junction box electrically connected to the plurality of photovoltaic cells, with the positive-voltage junction box being positioned at a first corner of an underside of the photovoltaic module, and a negative-voltage junction box electrically connected to the plurality of photovoltaic cells, with the negative-voltage junction box being positioned at a second corner on the underside of the photovoltaic module. The photovoltaic module further can have a first ribbon electrically connecting the photovoltaic cells to the positive-voltage junction box and a second ribbon electrically connecting the photovoltaic cells to the negative-voltage junction box. The photovoltaic modules can also include a frame configured to hold the plurality of photovoltaic cells. The positive-voltage junction box at the first corner and the negative-voltage junction box at the second corner can be both positioned along the same long edge of the photovoltaic module, or in diagonally opposite corners of the photovoltaic module. Conversely, the positive-voltage junction box at the first corner and the negative-voltage junction box at the second corner can be both positioned along a same short edge of the photovoltaic module, or in diagonally opposite corners of the photovoltaic module. The positive-voltage junction box and the negative-voltage junction box can both have wiring elements extendable from the photovoltaic module. In such aspects, wiring elements can be retractable into the respective positive-voltage junction box or negative-voltage junction box.

In some embodiments, the present disclosure is directed to a photovoltaic array having photovoltaic modules arranged in an array, where each photovoltaic module has a positive-voltage junction box being positioned at a first corner of an underside of the photovoltaic module and a negative-voltage junction box being positioned at a second corner on the underside of the photovoltaic module. A first row of the array can be formed from those photovoltaic modules, electrically connected to each other and each photovoltaic module of the first row being oriented in a first direction, and a second row of the array can be formed from those photovoltaic modules, electrically connected to each other, where each photovoltaic module of the second row is oriented in a second direction, the second direction being 180° opposite relative to the first direction. One or more photovoltaic modules in the first row can electrically connected to one or more photovoltaic module of the second row. The positive-voltage junction box of a first photovoltaic module can be electrically connected to the negative-voltage junction box of a second photovoltaic module that is adjacent to the first photovoltaic module in the first or second row. Similarly, the negative-voltage junction box of a first photovoltaic module can be electrically connected to the positive-voltage junction box of a third photovoltaic module adjacent to the first photovoltaic module in the first or second row. In some aspects, the positive-voltage junction box of a first photovoltaic module in the first row is electrically connected to the negative-voltage junction box of a second photovoltaic module in the second row that is adjacent to the first photovoltaic module in the first row. The photovoltaic array can further include a third row of photovoltaic modules, also formed from those photovoltaic modules, which are electrically connected to each other and oriented in the first direction, and where one photovoltaic module of the second row is electrically connected to one photovoltaic module of the third row. The positive-voltage junction box of a first photovoltaic module in the second row can be electrically connected to the negative-voltage junction box of a second photovoltaic module in the third row that is adjacent to the first photovoltaic module in the second row. Further, the electrical connection between the positive-voltage junction box of the first photovoltaic module in the second row and the negative-voltage junction box of the second photovoltaic module in the third row further comprises an electrical jumper. In some aspects, each photovoltaic module of the photovoltaic array includes: photovoltaic cells arranged within a frame and located on an upper side of the photovoltaic module; the positive-voltage junction box being electrically connected to the plurality of photovoltaic cells by a first electrical ribbon, and the negative-voltage junction box being electrically connected to the plurality of photovoltaic cells by a second electrical ribbon.

In some embodiments, the present disclosure is directed to a method of assembling a photovoltaic array, including mounting a first row of photovoltaic modules with corner junction boxes in a first orientation, electrically connecting corner junction boxes of adjacent photovoltaic modules in the first row so that a positive corner junction box of one PV module in the first row is connected to a negative corner junction box of a directly adjacent PV module, mounting a second row of photovoltaic modules with corner junction boxes in a second orientation, electrically connecting corner junction boxes of adjacent photovoltaic modules in the second row so that a positive corner junction box of one PV module in the second row is connected to a negative corner junction box of a directly adjacent PV module, electrically connecting a corner junction box of a photovoltaic module in the first row to a corner junction box of a photovoltaic module in the second row, mounting a third row of photovoltaic modules with corner junction boxes in the first orientation, electrically connecting corner junction boxes of adjacent photovoltaic modules in the third row so that a positive corner junction box of one PV module in the first row is connected to a negative corner junction box of a directly adjacent PV module, and electrically connecting a corner junction box of a photovoltaic module in the second row to a corner junction box of a photovoltaic module in the third row. In some embodiments, the photovoltaic modules are vertical photovoltaic modules arranged in a portrait configuration. In other embodiments, the photovoltaic modules are horizontal photovoltaic modules arranged in a landscape configuration. In further embodiments, the photovoltaic modules are square photovoltaic modules arranged in a square configuration. In some implementations, the corner junction box of a photovoltaic module in the first row connected to the corner junction box of a photovoltaic module in the second row are connected by an electrical connection along a lateral side of the photovoltaic array. In some implementations, the corner junction box of a photovoltaic module in the second row connected to the corner junction box of a photovoltaic module in the third row are connected by a long electrical connection along a lateral side of the photovoltaic array.

In further alternative embodiments, corner junction boxes may be located at all four corners of a rectangular or square photovoltaic module, where positive-voltage junction boxes can be located in corners that share an edge or can be located in diagonally opposite corners. Similarly in such embodiments, negative-voltage junction boxes can be located in corners that share an edge or can be located in diagonally opposite corners. Such embodiments can be configured such that a first electrical ribbon within a PV module connects to both positive-voltage junction boxes of the PV module, and such that a second electrical ribbon within a PV module connects to both negative-voltage junction boxes of the PV module. Such embodiments can avoid the need for a long connection across successive rows of PV modules in a photovoltaic array.

Other embodiments can have corner junction boxes in diagonally opposite corners of the photovoltaic modules. Some embodiments can have corner junction boxes all biased toward one side of their respective photovoltaic modules, such that at least one edge of a photovoltaic array has junction boxes along that side of the photovoltaic array.

In further embodiments, split junction boxes can be located toward the middle of edges on opposite sides of a photovoltaic module.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A photovoltaic array, comprising:
  a plurality of photovoltaic modules arranged in an array, each photovoltaic module having a positive-voltage junction box being positioned at a first corner of an underside of the photovoltaic module and a negative-voltage junction box being positioned at a second corner on the underside of the photovoltaic module;
  wherein each photovoltaic module comprises:
    a plurality of photovoltaic cells arranged within a frame and located on an upper side of the photovoltaic module;
    the positive-voltage junction box being electrically connected to the plurality of photovoltaic cells by a first electrical ribbon;
    the negative-voltage junction box being electrically connected to the plurality of photovoltaic cells by a second electrical ribbon; and
    the positive-voltage junction box and the negative-voltage junction box being directly electrically connected to each other by an electrical conduit;
  wherein the array comprises a first row of photovoltaic modules electrically connected to each other and each photovoltaic module of the first row being oriented in a first direction; and
  wherein the array comprises a second row of photovoltaic modules electrically connected to each other and each photovoltaic module of the second row being oriented in a second direction that is 180° opposite relative to the first direction, and wherein one photovoltaic module of the first row is electrically connected to one photovoltaic module of the second row.

2. The photovoltaic array of claim 1, wherein the positive-voltage junction box of a first photovoltaic module is electrically connected to the negative-voltage junction box of a second photovoltaic module adjacent to the first photovoltaic module in the first or second row.

3. The photovoltaic array of claim 2, wherein the negative-voltage junction box of a first photovoltaic module is electrically connected to the positive-voltage junction box of a third photovoltaic module adjacent to the first photovoltaic module in the first or second row.

4. The photovoltaic array of claim 1, wherein the positive-voltage junction box of a first photovoltaic module in the first row is electrically connected to the negative-voltage junction box of a second photovoltaic module in the second row that is adjacent to the first photovoltaic module in the first row.

5. The photovoltaic array of claim 1, wherein the photovoltaic array further comprises a third row of photovoltaic modules, selected from the plurality of photovoltaic modules, electrically connected to each other and oriented in the first direction, and wherein one photovoltaic module of the second row is electrically connected to one photovoltaic module of the third row.

6. The photovoltaic array of claim 5, wherein the positive-voltage junction box of a first photovoltaic module in the second row is electrically connected to the negative-voltage junction box of a second photovoltaic module in the third row that is adjacent to the first photovoltaic module in the second row.

7. The photovoltaic array of claim 6, wherein the electrical connection between the positive-voltage junction box of the first photovoltaic module in the second row and the negative-voltage junction box of the second photovoltaic module in the third row further comprises an electrical jumper.

8. The photovoltaic array of claim 1, wherein on each photovoltaic module the positive-voltage junction box at the first corner and the negative-voltage junction box at the second corner are both along a same long edge of the photovoltaic module.

9. The photovoltaic array of claim 1, wherein on each photovoltaic module the positive-voltage junction box at the first corner and the negative-voltage junction box at the second corner are both along a same short edge of the photovoltaic module.

10. The photovoltaic array of claim 1, wherein on each photovoltaic module the positive-voltage junction box and the negative-voltage junction box both have wiring elements extendable from the photovoltaic module.

11. The photovoltaic array of claim 10, wherein on each photovoltaic module the wiring elements are retractable into the respective positive-voltage junction box or negative-voltage junction box.

\* \* \* \* \*